United States Patent Office 2,964,507
Patented Dec. 13, 1960

2,964,507

1,1 - DIFLUORO - 2 - METHYLENE - 3 - DIFLUORO-METHYLENE CYCLOBUTANE AND POLYMERS THEREOF

Walter Henry Knoth, Jr., Mendenhall, Pa., assignor to E. I. du Pont de Nemours and Company, Wilmington, Del., a corporation of Delaware No Drawing. Filed Dec. 17, 1956, Ser. No. 628,547

6 Claims. (Cl. 260—87.5)

This invention relates to new unsaturated compounds and their polymers. More particularly, it relates to novel fluorine-containing cyclic compounds with exocyclic unsaturation and to their polymers.

Unsaturated compounds are useful in many applications. They are particularly useful for the preparation of polymers which can be formed into films, fibers, molding compositions, and the like, which are in turn employed in many practical applications. Since one of the factors contributing to the properties of the final polymer is the particular structure of the monomer from which it is made, it is a desirable goal to prepare new unsaturated monomers in order to obtain new polymers having novel and improved properties.

An object of this invention is to prepare novel compounds which serve as intermediates in the production of new and useful polymers. A further object is to prepare stabilized monomeric compositions. Still a further object is the preparation of solvent resistant films and molded objects. These and other objects will become apparent from the following disclosure.

The novel products of this invention are 1,1-difluoro-2-methylene-3-difluoromethlenecyclobutane, and its polymers having a substantial proportion of

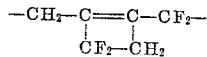

units. Preferably, the polymers of this invention have a predominant proportion of these units.

The 1,1 - difluoro - 2 - methylene-3-difluoromethylene-cyclobutane can be prepared in various ways. One method is by heating a solution of 1,1-difluoroallene in an inert solvent, under the autogenous pressure developed by the reaction system. Heating of the reaction mixture should take place at a temperature of 50° to 150° C. Temperatures between 75° and 125° C. are preferred for ease and speed of the reaction.

The exact time of heating depends on the particular reaction temperature employed. At 95° C., reaction times of 16–20 hours are sufficient. At lower temperatures, longer times are required, while at higher temperatures, shorter times can be used. Preferably, the reaction vessel is swept out with an inert gas, e.g., nitrogen, and then is evacuated prior to carrying out the heating.

Any organic solvent which is inert under the reaction conditions is satisfactory for use in the process of this invention. Hydrocarbons and ethers are particularly suitable for this purpose. Specific solvents that can be used include benzene, octane, decane, cyclohexane, diethyl ether, diisobutyl ether, and dioxane. The proportion of solvent is not critical. Solutions containing about 10% of 1,1-difluoroallene are very satisfactory but solutions of concentration ranging from 5% to 25% or more can be used, if desired.

The 1,1-difluoroallene used as starting material in the process of this invention can be prepared by the pyrolysis of 1-methylene-2,2,3,3-tetrafluorocyclobutane, as described in U.S. Patent 2,733,278 to J. L. Anderson.

Heating of the reaction mixture is continued until no further pressure drop is noticed in the closed system. The monomeric 1,1-difluoro-2-methylene-3-difluoromethylene-cyclobutane produced is isolated from the reaction mixture by fractional distillation.

An alternate method of preparing the monomer of the invention is by passing the vapor of 1,1-difluoroallene through a reaction zone heated to 200° C. to 350° C., preferably at 250–300° C., at atmospheric or superatmospheric pressure. Preferably the 1,1-difluoroallene vapor is mixed with an inert gas, e.g., nitrogen, when it is passed through the heated reaction zone. In this method, the contact time of the 1,1-difluoroallene at the reaction temperature is less than in the method described previously, contact times of 0.2 to 2.0 minutes being satisfactory. The monomeric 1,1-difluoro-2-methylene-3-difluoromethylene-cyclobutane formed is isolated from the effluent reaction mixture by fractional distillation.

Monomeric 1,1 - difluoro-2-methylene-3-difluoromethylenecyclobutane polymerizes spontaneously at ordinary temperatures. If desired, the monomer can be stabilized by incorporating in it a polymerization inhibitor immediately after its preparation. Hydroquinone and quinone inhibit the polymerization of the monomer for a short time. However, if permanent stabilization is desired, phenothiazine is used. An amount of inhibitor ranging from 0.5 to 20% of the weight of the monomer is satisfactory, although these percentages are by no means critical.

Homopolymers of 1,1-difluoro-2-methylene-3-difluoromethylenecyclobutane are formed by spontaneous polymerization of the monomer. Hard, white, solid polymers insoluble in common organic solvents are obtained from the monomeric 1,1-difluoro-2-methylene-3-difluoromethyl-enecyclobutane (freshly distilled from an inhibitor-containing monomer) at ordinary, reduced, or elevated temperatures. The solid homopolymers result from the monomer in three to four days at temperatures of about −80° C., in 30 minutes to two hours at 0° C. and in less than one-half hour at temperatures of 25–30° C. Even shorter times are required when the monomer is polymerized at temperatures of 50° C. or more. The polymerization can be accomplished under atmospheric, subatmospheric or super-atmospheric pressures. The polymerization can also be carried out in the presence of free radical-liberating polymerization initiators, e.g., in the presence of benzoyl peroxide or α,α'-azodiisobutyronitrile. Such initiators can be used in proportions ranging from 0.01% to 10% by weight of the monomer.

Copolymers of 1,1 - difluoro - 2 - methylene-3-difluoromethylenecyclobutane with other copolymerizable ethylenic compounds containing substantial proportions of the former monomer can be prepared by adding a free radical-liberating initiator, e.g., benzoyl peroxide, to a mixture of 1,1 - difluoro - 2 - methylene-3-difluoromethylenecyclobutane and a substantial proportion (5–95% by weight) of another polymerizable ethylenic compound, e.g., tetrafluoroethylene or acrylonitrile.

The products and process of this invention are illustrated in further detail in the following examples, in which the proportions of ingredients are expressed in parts by weight unless otherwise noted.

*Example 1*

A solution of 11 g. of 1,1-difluoroallene in 95 g. of decane is placed in a vessel capable of withstanding pressure, and the free space in the vessel is then flushed out with nitrogen, the vessel closed and evacuated. The closed reaction vessel is heated to 95° C. until no further drop in pressure is observed, 16 hours being required. During the heating period, the pressure in the reaction vessel decreases from 22 lb./sq. in., gauge, to 3 lb./sq. in. After cooling, the reaction vessel is opened, and the reaction mixture is fractionally distilled. There is obtained 0.7 g. of 1,1-difluoro-2-methylene-3-difluoromethylenecyclobutane.

1,1 - difluoro - 2-methylene-3-difluoromethylenecyclobutane has a boiling point of 68–70° C. at 760 mm. The structure of this compound is characterized by nuclear magnetic resonance analysis, infrared absorption, reaction with bromine to form a dibromide of the expected composition, and by elemental analysis of its polymer. 1,1-difluoro-2 - methylene - 3 - difluoromethylenecyclobutane polymerizes at room temperature unless inhibited, preferably with phenothiazine.

*Example 2*

1,1-difluoroallene (21.5 g.) is passed at a rate of 320 cc. per minute, concurrently with a 55 cc. per minute flow of nitrogen, through a glass tube of 1¼ inch outside diameter packed with quartz cylindrical packing and heated over a 33 inch length to a temperature of 250–295° C. The effluent reaction product is collected in a vessel containing 1 g. of phenothiazine and is cooled in a bath of ice water. Distillation of the crude product under reduced pressure yields 6.4 g. (30% conversion) of 1,1-difluoro-2-methylene-3-difluoromethylenecyclobutane boiling at 47–50° C./300 mm.

*Example 3*

1,1-difluoro - 2 - methylene-3 - difluoromethylenecyclobutane stabilized by phenothiazine (5% by weight) is subjected to distillation. One part of the inhibitor-free distillate is placed in a glass vessel cooled by a bath of ice water. After two hours at 0° C., the reaction vessel is removed from the ice water bath, and the product is found to be a hard, white, solid polymer of 1,1-difluoro-2-methylene-3-difluoromethylenecyclobutane. This polymer is insoluble in common organic solvents, e.g., benzene, petroleum ether, acetone, xylene, chloroform, carbon tetrachloride, ethyl ether, and dimethylformamide.

The polymer of 1,1-difluoro-2-methylene-3-difluoromethylenecyclobutane is pressed at 125–160° C. under 500–18,000 lb./sq. in. pressure to a clear, tough, flexible film. This film softens at temperatures of about 150° C., and the film is resistant to boiling nitric acid. Heating the polymer to about 165° C. converts it temporarily to a rubbery form. This rubbery polymer can be stretched and worked at room temperature, and this treatment converts it to a non-rubbery form which is fibrilated and has the appearance of an oriented, cold drawn crystalline polymer. The polymer as originally formed cannot be cold drawn.

Infrared absorption spectra obtained on the polymer shows the presence of cyclobutene unsaturation and the absence of terminal methylene and terminal difluoromethylene unsaturation. Elemental analysis of the polymer shows that it contains 49.53% F, 47.38% C, and 2.82% H. On the basis of these results, the polymer is believed to contain recurring cyclobutene units of the following structure:

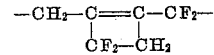

The polymers of 1,1-difluoro-2-methylene-3-difluoromethylenecyclobutane are significantly different in their properties and characteristics from the polymers of 1,1-difluoroallene. Difluoroallene when polymerized in benzene solution using 1,1'-azodicyclohexanecarbonitrile as the initiator at 105° C. for five hours at autogenous pressure gives a polymer which is a yellow, viscous acetone-soluble liquid. Infrared analysis of the difluoroallene polymer shows the presence of both terminal methylene and terminal difluoromethylene unsaturation as well as the possibility of some cyclobutene unsaturation. The liquid polymers are not useful for the formation of films and molding compositions as are the polymers of 1,1-difluoro-2-methylene-3-difluoromethylenecyclobutane of this invention.

The products of this invention are useful for a variety of purposes. For example, monomeric 1,1-difluoro-2-methylene-3-difluoromethylenecyclobutane can be brominated in carbon tetrachloride solution to give a dibromide boiling at 84° C./36 mm. which is an extremely potent lacrymator.

The polymers of 1,1-difluoro-2-methylene-3-difluoromethylenecyclobutane are useful for the formation of self-supporting films and for molding into desired shapes.

I claim:

1. 1,1-difluoro-2-methylene-3 - difluoromethylenecyclobutane.

2. A composition comprising 1,1-difluoro-2-methylene-3-difluoromethylenecyclobutane and phenothiazine in an amount sufficient to stabilize the composition.

3. Homopolymers of the compound of claim 1.

4. A copolymer of 1,1-difluoro-2-methylene-3-difluoromethylene cyclobutane and from 5–95% of another polymerizable ethylenic compound of the group consisting of tetrafluoroethylene and acrylonitrile.

5. A method of reacting 1,1-difluoroallene to form 1,1-difluoro-2-methylene-3-difluoro methylene cyclobutane which comprises heating at a temperature of between about 50 and 150° C. a solution thereof in an organic solvent, which is inert under the reaction conditions, contained in a sealed vessel.

6. A method of reacting 1,1-difluoroallene to form 1,1-difluoro-2-methylene-3-difluoro methylene cyclobutane which comprises passing the same through a reaction zone for contact times of between about 0.2 and 2 minutes, at temperatures of from 200° to 350° C. and in an inert gas.

References Cited in the file of this patent

UNITED STATES PATENTS

| | | |
|---|---|---|
| 2,223,171 | Gaylor | Nov. 26, 1940 |
| 2,462,347 | Barrick | Nov. 22, 1949 |
| 2,733,278 | Anderson | Jan. 31, 1956 |